Patented Sept. 23, 1947

2,427,857

UNITED STATES PATENT OFFICE 2,427,857

COATING COMPOSITION

John Hamill, New York, N. Y.

No Drawing. Application April 21, 1944,
Serial No. 532,203

3 Claims. (Cl. 99—166)

1

This invention relates to method and composition for coating materials and more particularly for the coating and preserving of foods or similar materials whereby they may be preserved.

Foods such as fruit, root crops, eggs, meat, fish, etc. lose quality when exposed to the atmosphere. These foods, for example, lose moisture to the atmosphere even though they be kept under refrigeration. Also, certain fruits such as the citrus fruits, apples, pears, peaches, etc. lose moisture to the atmosphere even though they do not decay. The same applies to eggs. Likewise seeds may be protected from germinating and from deteriorating.

It is an object of the present invention to provide a coating for such foods to protect them against losing moisture to the atmosphere and to prolong their life against decomposition that may occur either as a result of fungus growth or bacterial decomposition.

It is a further object to provide such a coating which is not injurious to the health, and which does not adversely affect the taste, natural odor, or color of the food.

I have discovered that a composition including an aliphatic alcohol (such as ethylene, propylene, or butylene glycol), glutin, orthodichlorobenzene, dissolved in water, may be applied to the food product, and that when applied and subsequently dried, forms a coating which will keep the food from spoiling, and will keep it from losing moisture to the ambient atmosphere. To offset the odor of the orthodichlorobenzene, an aromatic substance such as ethyl acetate or a suitable deodorant such as magnesium acetate may be added to the mixture.

The gelatin which forms the basis for the coating is maintained in a tough pliable, highly elastic condition free from cracks or holes by the action of the orthodichlorobenzene. The use of the aliphatic alcohol also aids in maintaining the coating in proper condition. The coating itself and the food product immediately adjacent the coating is kept from deteriorating due to fungus or bacterial action by the orthodichlorobenzene, which also renders the coating pest repellent.

As an example of satisfactory mixture, in 100 parts of the aliphatic alcohol (preferably ethylene glycol), 100 parts (by weight) of glutin (preferably in the powdered form of gelatin) is dissolved. To this solution is added approximately 8 parts of orthodichlorobenzene. To one part of the resulting mixture approximately 20 parts by weight of water may be added to dissolve the entire mixture to form a solution. To counteract the odor of the orthodichlorobenzene, .00025 part of ethyl acetate may be added to one part of the water solution.

This solution may then be applied to the food either by dipping the food into the solution or by spraying the solution on the food, and causing the water to evaporate to leave the coating. The proportion of water may be varied considerably according to the porosity and other physical characteristics of the surface of the product to be treated. When rougher products (i. e., with larger pores) such as citrus fruits or meat are coated, less water is used thereby making a thick coating; whereas when smooth products such as eggs are coated more water may be used thereby making a thinner coating.

The coating is particularly useful in coating ripe fruit for shipping. The coating serves to preserve such ripe fruit for some period of time.

It is also useful for protecting dressed or gutted poultry, fish, and for protecting dehydrated foods from moisture and surface bacterial growth.

Since many embodiments might be made of the above invention and since many changes might be made in the embodiment disclosed herein, it is to be understood that the foregoing description is to be interpreted as illustrative only and not in a limiting sense.

I claim:

1. A coating mixture for preserving foods, said mixture comprising, a water solution of ethylene glycol, powdered gelatin, orthodichlorobenzene, and ethyl acetate.

2. A coating mixture for preserving foods, said mixture comprising, 100 parts of ethylene glycol, 100 parts of powdered gelatin, 10 parts of odthodichlorobenzene, 4000 parts of water, and 1 part of a suitable deodorant taken from the class consisting of ethyl acetate and magnesium acetate.

3. The method of preserving food products comprising applying to the food product a water solution of ethylene glycol, gelatin, orthodichlorobenzene and ethyl acetate, and allowing the water to evaporate to leave on the food product a tough pliable gelatin coating.

JOHN HAMILL.

REFERENCES CITED

The following references are of record in the file of this patent:

UNITED STATES PATENTS

| Number | Name | Date |
|---|---|---|
| 556,471 | Morris et al. | Mar. 17, 1896 |
| 1,148,823 | Bocande | Aug. 3, 1915 |
| 1,914,351 | Hall et al. | June 13, 1933 |
| 1,981,926 | Savage | Nov. 27, 1934 |
| 2,345,891 | Sullivan | Apr. 4, 1944 |

FOREIGN PATENTS

| Number | Country | Date |
|---|---|---|
| 4,329 | Great Britain | 1902 |
| 17,124 | Great Britain | 1903 |